United States Patent
Su

(10) Patent No.: US 7,999,426 B2
(45) Date of Patent: Aug. 16, 2011

(54) MOTOR OVERLOAD PROTECTION DEVICE

(75) Inventor: Xiao-Guang Su, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 202 days.

(21) Appl. No.: 12/432,750

(22) Filed: Apr. 30, 2009

(65) Prior Publication Data

US 2010/0164312 A1    Jul. 1, 2010

(30) Foreign Application Priority Data

Dec. 30, 2008  (CN) .......................... 2008 1 0306683

(51) Int. Cl.
*H02K 7/10* (2006.01)
*H02K 5/10* (2006.01)
*H02K 5/12* (2006.01)
*H02K 49/00* (2006.01)
*H02K 15/00* (2006.01)

(52) U.S. Cl. ................ 310/78; 310/83; 310/92; 310/97; 310/99; 310/101

(58) Field of Classification Search .................. 139/100; 242/415.1; 475/269; 464/47, 48; 192/56.1; 173/96, 176; 310/83, 92–101, 78; *H02K 15/00, H02K 49/00, 5/10, 5/12, 7/10*
See application file for complete search history.

(56) References Cited

U.S. PATENT DOCUMENTS

| | | | | |
|---|---|---|---|---|
| 2,855,940 | A * | 10/1958 | Milleville et al. ................. | 137/1 |
| 3,659,128 | A * | 4/1972 | Danek ............................. | 310/99 |
| 3,805,645 | A * | 4/1974 | Jenny .............................. | 81/476 |
| 5,295,909 | A * | 3/1994 | Heidenreich ................... | 464/48 |
| 5,573,091 | A * | 11/1996 | Hung .......................... | 192/12 R |
| 5,668,424 | A * | 9/1997 | Lamb ............................ | 310/103 |
| 6,462,447 | B1 * | 10/2002 | Baker ........................... | 310/103 |
| 6,537,169 | B1 * | 3/2003 | Morii ............................. | 475/8 |
| 6,573,621 | B2 * | 6/2003 | Neumann ..................... | 307/150 |
| 2006/0135267 | A1 * | 6/2006 | Bosk .............................. | 464/43 |
| 2006/0287157 | A1 * | 12/2006 | Katoh et al. .................. | 475/263 |
| 2008/0007130 | A1 * | 1/2008 | Edelson ......................... | 310/82 |
| 2009/0038904 | A1 * | 2/2009 | Bosk ............................. | 192/56.1 |

* cited by examiner

*Primary Examiner* — Quyen Leung
*Assistant Examiner* — Terrence Kenerly
(74) *Attorney, Agent, or Firm* — Frank R. Niranjan

(57) ABSTRACT

The present disclosure provides a motor overload protection device that includes a driving gear, a loading wheel, and at least one protecting gear unit rotatably fixed to the loading wheel. The loading wheel defines a central through hole for rotatably receiving a rotor of a motor. The driving gear is fixed on the rotor. The at least one protecting gear unit is rotated by the rotor. A resistance between the at least one protecting gear unit and the loading wheel is predetermined. When the load on the loading wheel is less than or equal to the maximum load of the motor, the resistance keeps the loading wheel and the at least one protecting gear unit together rotating around the rotor of the motor. When the load is greater than the maximum load of the motor, the at least one protecting gear unit rotates relative to the loading wheel.

11 Claims, 3 Drawing Sheets

MOTOR OVERLOAD PROTECTION DEVICE

BACKGROUND

1. Technical Field

The present disclosure relates to overload protection, and particularly, to a motor overload protection device.

2. Description of Related Art

When the load of a motor is beyond the rated capacity of the motor, the motor is considered as being overloaded. Under this condition, the motor overheats and a thermal circuit breaker shuts down the power supplied to the motor. However, because of inertia, the motor continues to rotate even after the power is off. As a result of this residual rotation, damages to the gears of the motor and the overload may occur.

What is needed, therefore, is a motor overload protection device to overcome the above-described problem.

BRIEF DESCRIPTION OF THE DRAWINGS

Many aspects of the present motor overload protection device can be better understood with reference to the following drawings. The components in the drawings are not necessarily drawn to scale, the emphasis instead being placed upon clearly illustrating the principles of the present motor overload protection device.

DETAILED DESCRIPTION

Embodiments of the present disclosure will now be described in detail below, with reference to the accompanying drawings.

Figure 1:
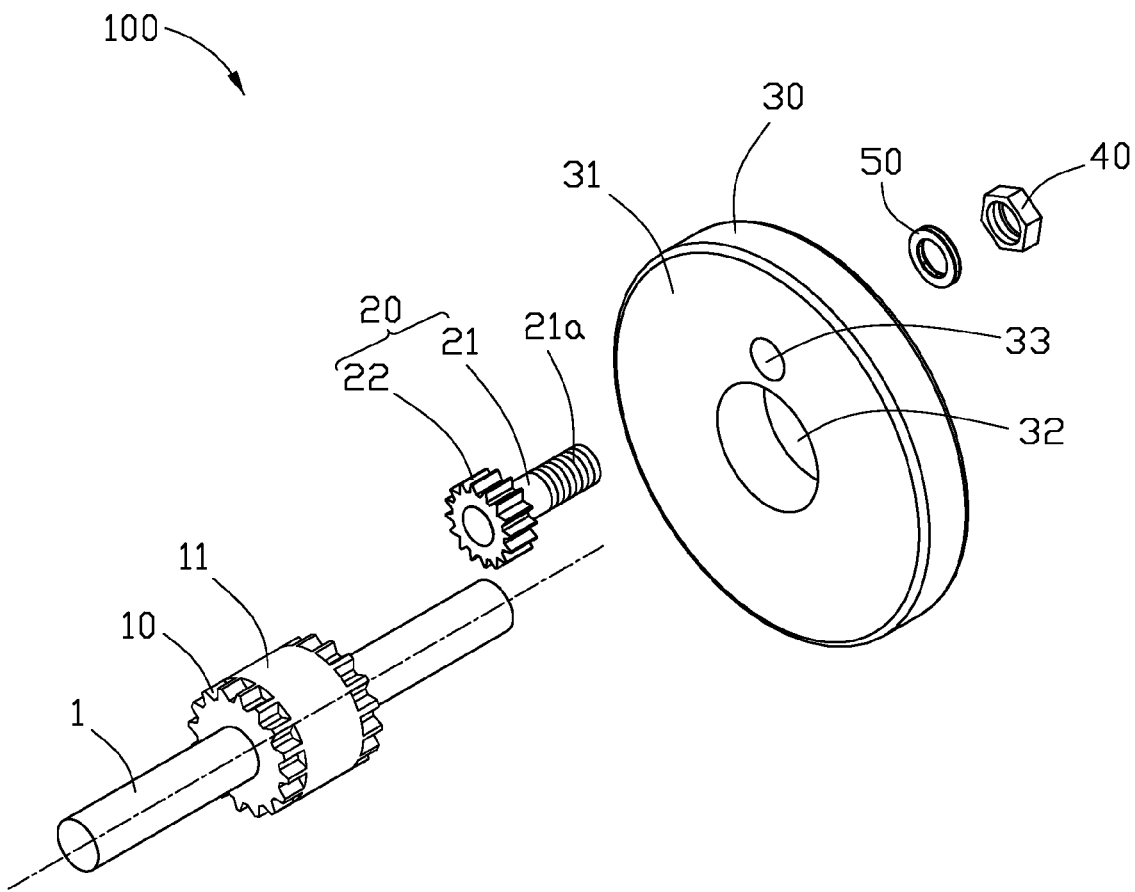
FIG. 1 is a schematic exploded view of a motor overload protection device according to an exemplary embodiment.
Figure 2:
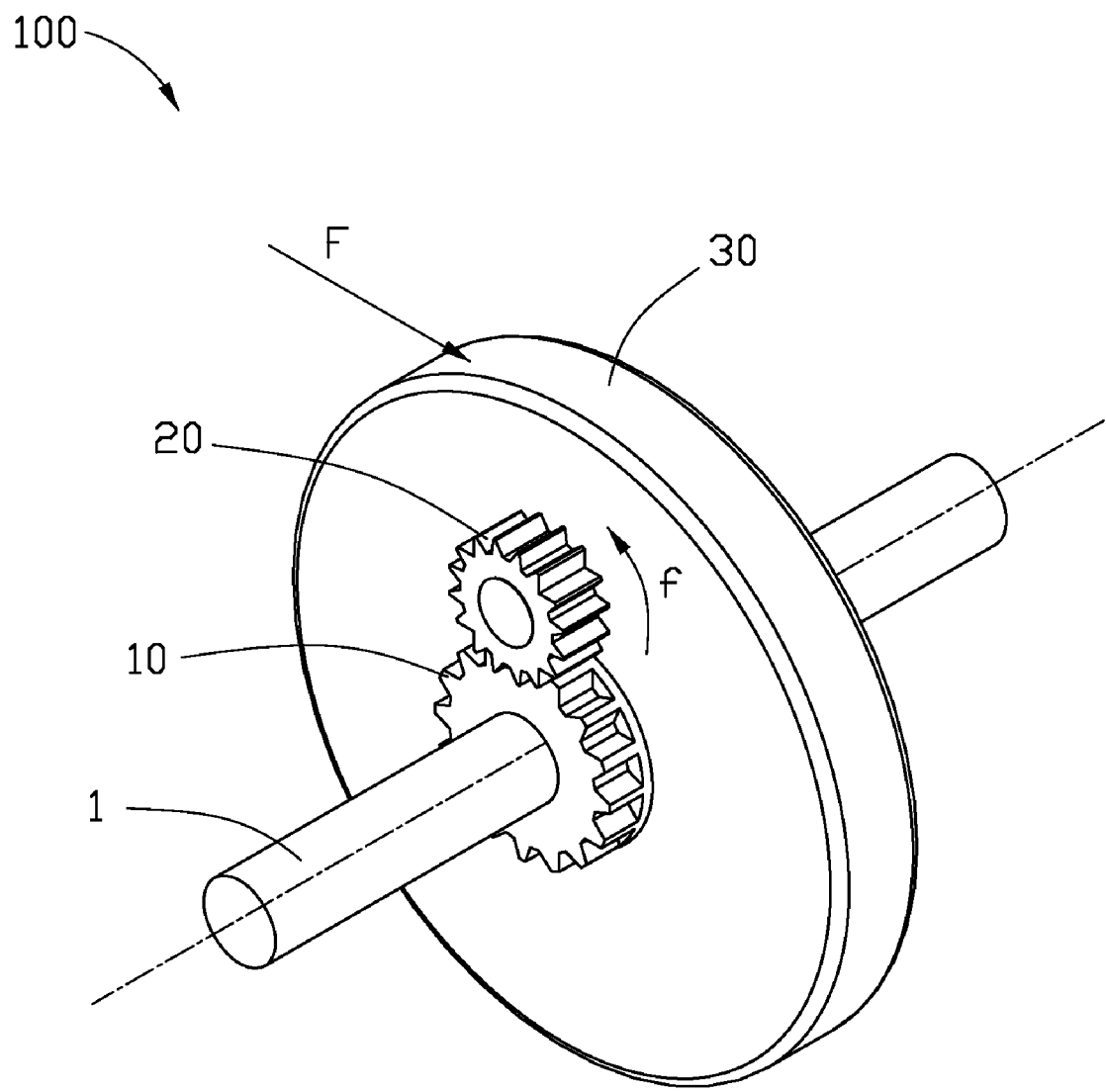
FIG. 2 is a schematic assembled view of the motor overload protection device of FIG. 1.

Referring to FIGS. 1 and 2, a motor overload protection device 100, according to an exemplary embodiment, is shown. The motor overload protection device 100 includes a driving gear 10, at least one protecting gear unit 20, a loading wheel 30, a fastener 40, and an elastic washer 50. The motor overload protection device 100 is mounted on a rotor 1 of the motor (not shown). The driving gear 10 is fixed to the rotor 1. The driving gear 10 is coaxial to the rotor 1. The driving gear 10 can be formed integrated with the rotor 1. In the present embodiment, the rotor 1 includes a ring-shaped flange 11 extending around the outer surface of the rotor 1. The driving gear 10 is integrally formed with the ring-shaped flange 11. In other embodiments, the driving gear 10 can also be separately fixed on the rotor 1.

The protecting gear unit 20 includes a gear shaft 21 and a protecting gear 22. The gear shaft 21 extends substantially perpendicularly from the center of the protecting gear 22 such that the protecting gear 22 is coaxially fixed on one end of the gear shaft 21. The gear shaft 21 has a threaded end 21a away from the protecting gear 22.

The loading wheel 30 is driving a load having a resistive force of F. The loading wheel 30 defines a first hole 32 at the center of the loading wheel 30 and a second hole 33 adjacent to the first hole 32. The rotor 1 is received in the first hole 32, and rotates in the first hole 32 via the ring-shaped flange 11. The protecting gear unit 20 is rotatably fixed on the loading wheel 30 with the gear shaft 21 rotatably inserted through the second hole 33. The distance between the first hole 32 and the second hole 33 is defined such that the protecting gear 22 meshes with the driving gear 10. In order to improve the stability of the motor overload protection device 100, the motor overload protection device 100 can include more than one protecting gear unit 20.

The fastener 40 is a nut, which engages with the threaded end 21a of the gear shaft 21. In the present embodiment, the resistance f is the total frictional force between the protecting gear unit 20 and the loading wheel 30 and the elastic washer 50 and the loading wheel 30. The resistance f is provided by the fastener 40. The resistance f can be changed by tightening or loosening the engagement of the fastener 40 on the threaded end 21a. In an alternative embodiment, the frictional force between the protecting gear unit 20 and the loading wheel 30 can be changed by high friction materials disposed between the protecting gear unit 20 and the loading wheel 30. In another embodiment, the frictional force between the protecting gear unit 20 and the loading wheel 30 can be changed by roughening common surfaces between the protecting gear unit 20 and the loading wheel 30. In this case, the resistance f is predetermined and should be equal to or less than the rated capacity of the motor.

Figure 3:
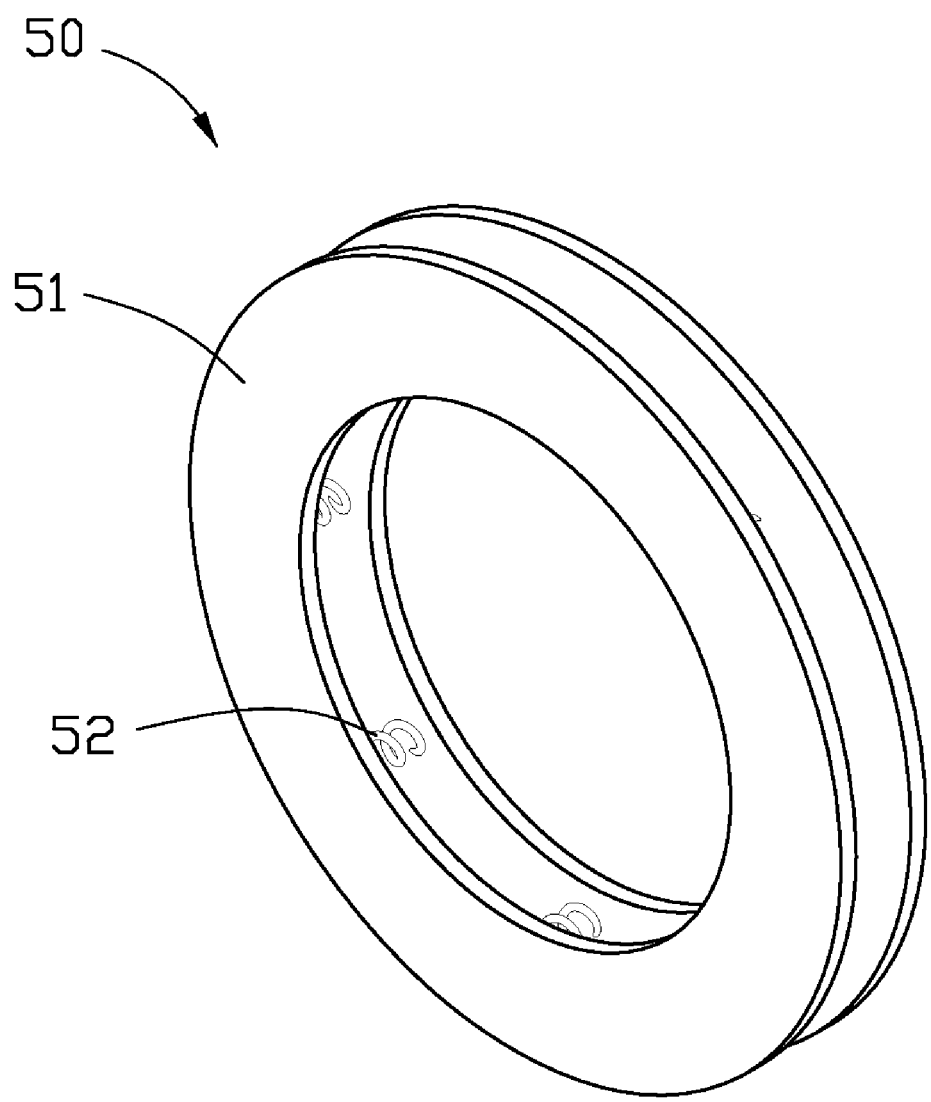
FIG. 3 is an enlarged view of an elastic washer of the motor overload protection device of FIG. 1.

The elastic washer 50 is disposed between the fastener 40 and the loading wheel 30 and sleeved on the gear shaft 21 for changing the resistance f easily. Referring to FIG. 3, the elastic washer 50 includes two spacers 51, and a number of springs 52. The two spacers 51 are ring-shaped. The springs 52 are disposed between the two spacers 51 with two ends thereof fixed to the two spacers 51.

In the present embodiment, when the force F on the loading wheel 30 is less than or equal to the maximum driving force of the motor, the loading wheel 30 and the protecting gear unit 20 will together rotate around the rotor 1, but in the opposite direction to the rotation of the rotor 1. When the force F on the loading wheel 30 is greater than the maximum driving force of the motor, the loading wheel 30 will stop rotating and the protecting gear unit 20 will continue to rotate. The protecting gear unit 20 will rotate relative to the loading wheel 30 because the load on the loading wheel 30 is greater than the resistance f between the protecting gear unit 20 and the loading wheel 30. The motor will continue to run at maximum load to overcome the resistance f. Therefore, the motor will never be overloaded and thus is not susceptible to damage from overloading. Because the load is not directly connected to the rotor 1, the load can stay stationary and the rotor 1 can continue to rotate without damaging each other.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A motor overload protection device, the motor overload protection device connecting to a rotor of a motor, the motor overload protection device comprising:

a loading wheel defining a central through hole for rotatably receiving the rotor of the motor;

a driving gear fixed on the rotor; and at least one protecting gear unit rotatably fixed to the loading wheel and capable of rotating about a rotating axis spaced away from a rotating axis that the driving gear rotates about, the at least one protecting gear unit engaging the driving gear, a resistance between the at least one protecting gear unit and the loading wheel being predetermined, whereby when the load on the loading wheel is equal to or less than a maximum load of the motor, the driving gear engages the at least one protecting gear unit, the resistance between the at least one protecting gear unit and the loading wheel keeps the loading wheel and the at least one protecting gear unit together rotating around the rotor of the motor, and when the load is greater than the maximum load of the motor, the driving gear drives the at least one protecting gear unit to rotate relative to the loading wheel.

2. The motor overload protection device as claimed in claim 1, wherein the resistance is the friction force between the at least one protecting gear unit and the loading wheel.

3. The motor overload protection device as claimed in claim 2, wherein the at least one protecting gear unit further comprises a protecting gear and a gear shaft, the protecting gear meshed with the driving gear and frictionally engaging the loading wheel, the gear shaft substantially perpendicularly extended from the central portion of the protecting gear, and the loading wheel defines a through hole adjacent to the central portion through hole for rotatably receiving the gear shaft.

4. The motor overload protection device as claimed in claim 3, wherein the gear shaft comprises a threaded end away from the protecting gear and the motor overload protection device comprises a fastener threadedly fastened to the threaded end of the gear shaft to rotatably fix the at least one protecting gear unit on the loading wheel.

5. The motor overload protection device as claimed in claim 4, wherein the fastener is a nut.

6. The motor overload protection device as claimed in claim 4, wherein the resistance is controlled by the fastener.

7. The motor overload protection device as claimed in claim 1, wherein the resistance is controlled by using friction pieces disposed between the at least one protecting gear unit and the loading wheel.

8. The motor overload protection device as claimed in claim 1, wherein the resistance is controlled by forming rough surface on the contact surface between the at least one protecting gear unit and the loading wheel.

9. The motor overload protection device as claimed in claim 4, further comprising an elastic washer disposed between the fastener and the loading wheel and sleeved on the gear shaft.

10. The motor overload protection device as claimed in claim 9, wherein the elastic washer comprises two spacers and a plurality of springs disposed therebetween.

11. The motor overload protection device as claimed in claim 1, wherein the driving gear and the rotor are integrally formed.

\* \* \* \* \*